(12) United States Patent
Juaristi Larrinaga

(10) Patent No.: US 11,207,972 B2
(45) Date of Patent: Dec. 28, 2021

(54) RADIATOR ASSEMBLY

(71) Applicant: CIKAUTXO, S. COOP., Berriatua (ES)

(72) Inventor: Gotzon Juaristi Larrinaga, Berriatua (ES)

(73) Assignee: CIKAUTXO, S. COOP., Berriatua (ES)

( * ) Notice: Subject to any disclaimer, the term of this patent is extended or adjusted under 35 U.S.C. 154(b) by 327 days.

(21) Appl. No.: 16/279,087

(22) Filed: Feb. 19, 2019

(65) Prior Publication Data

US 2019/0176611 A1 Jun. 13, 2019

Related U.S. Application Data

(63) Continuation of application No. PCT/ES2016/070841, filed on Nov. 25, 2016.

(51) Int. Cl.
*B60K 11/04* (2006.01)
*F16F 15/08* (2006.01)
*F16B 37/04* (2006.01)

(52) U.S. Cl.
CPC ........... *B60K 11/04* (2013.01); *F16F 15/08* (2013.01); *F16B 37/043* (2013.01); *F16F 2224/025* (2013.01); *F16F 2226/04* (2013.01)

(58) Field of Classification Search
CPC ......... B60K 11/04; B60K 11/02; B60K 11/00; F16B 37/043; F16B 37/00; F16B 37/041;
(Continued)

(56) References Cited

U.S. PATENT DOCUMENTS 3,700,061 A * 10/1972 Hortnagl ................ B60K 11/04
 180/68.4
6,167,946 B1 * 1/2001 Uchikawa ............... F28F 9/002
 123/41.14

(Continued)

FOREIGN PATENT DOCUMENTS

WO 2018096189 A1 5/2018

OTHER PUBLICATIONS

International Preliminary Report on Patentability in corresponding PCT Application No. PCT/ES2016/070841, dated Jun. 29, 2018, 21 pages.

(Continued)

*Primary Examiner* — James M Dolak
(74) *Attorney, Agent, or Firm* — Edell, Shapiro & Finnan, LLC

(57) ABSTRACT

According to one embodiment a radiator assembly is provided that includes a radiator and a stiffening frame which supports the radiator and which enables its attachment to the front panel of a vehicle. The attachment of the radiator to the stiffening frame is performed through at least one upper support which is attached to the radiator. The support, which is configured for absorbing vibrations, is fixed in a housing of the stiffening frame. The upper support includes a main body made from an elastomeric material, such as rubber, and a fixing element made from a second material, such as plastic, having a higher hardness than the material of the main body. The fixing element includes elastic retaining means configured for retaining the upper support when it is introduced into the housing of the stiffening frame.

14 Claims, 7 Drawing Sheets

(58) Field of Classification Search
CPC . F16B 37/04; F16F 15/08; F16F 15/00; F16F 15/04; F16F 15/02; F16F 2224/025; F16F 2226/04
See application file for complete search history.

(56) References Cited

U.S. PATENT DOCUMENTS

| | | | | |
|---|---|---|---|---|
| 6,386,497 | B1 * | 5/2002 | Guyomard | B60K 11/04 248/316.7 |
| 6,412,581 | B2 * | 7/2002 | Enomoto | B60K 11/04 165/69 |
| 7,036,617 | B2 * | 5/2006 | Harada | B60K 11/04 180/68.4 |
| 7,861,988 | B2 * | 1/2011 | Hamida | B60K 11/04 248/232 |
| 7,882,913 | B2 * | 2/2011 | Maeda | B60K 11/04 180/68.4 |
| 8,051,933 | B2 * | 11/2011 | Hwang | B60H 1/00535 180/68.4 |
| 8,210,298 | B2 * | 7/2012 | Hemmersmeier | B62D 25/084 180/68.4 |
| 8,826,538 | B2 * | 9/2014 | Itoh | B60K 11/04 29/890.03 |
| 9,849,774 | B2 * | 12/2017 | Hutchins | B60K 11/04 |
| 11,078,924 | B2 * | 8/2021 | Schafer | F04D 29/584 |
| 11,097,610 | B2 * | 8/2021 | Han | F01P 11/10 |
| 2003/0146030 | A1 | 8/2003 | Harada | |
| 2004/0089769 | A1 * | 5/2004 | Carrier | B60K 11/04 248/71 |
| 2009/0152033 | A1 | 6/2009 | Choi | |
| 2009/0195028 | A1 | 8/2009 | Glickman et al. | |

OTHER PUBLICATIONS

International Search Report and Written Opinion in corresponding PCT Application No. PCT/ES2016/070841, dated Sep. 4, 2017, 12 pages.

* cited by examiner

RADIATOR ASSEMBLY

CROSS-REFERENCE TO RELATED APPLICATIONS

This application relates to and claims the benefit and priority to International Application No. PCT/ES2016/070841, filed Nov. 25, 2016.

TECHNICAL FIELD

The present invention relates to radiator assemblies in which a radiator is supported by a front panel inside a vehicle.

BACKGROUND

Radiators intended for being mounted in the front part of a vehicle are typically square or rectangular and comprise on each side an upper pin and another lower pin. Rubber supports are usually placed on the pins which allow attaching the radiator to the front panel of the vehicle directly or through a stiffening frame. The supports, typically circular in shape, are suitable for absorbing vibrations, i.e., for preventing or minimizing the transmission of vibrations to the radiator.

Conventionally, the insertion direction of rubber supports in the front panel is usually in a vertical direction Y. However, it is also known that the upper supports, intended for attaching the upper part of the radiator with the front panel, include an additional body allowing the insertion direction to be in a direction X, perpendicular to direction Y, for example horizontal.

In this sense, US20090152033 A1 discloses a radiator assembly comprising a radiator attached through an upper support to a frame supporting the radiator. The support comprises a main body and a fixing element. The fixing element comprises a space that allows for housing part of the main body. The fixing element comprises guiding arms at the sides that are housed in ribs arranged in the frame, such that during insertion of the main body it is guided by the arms. The main body must be introduced up to the end of its path of travel and then fixed to the front panel by means of a screw.

SUMMARY

A radiator assembly is provided that comprises a radiator and a stiffening frame supporting the radiator and enabling its attachment to a front panel of a vehicle. The attachment of the radiator to the stiffening frame is performed through at least one upper support attached to the radiator. The support, which is configured for absorbing vibrations, is fixed in a housing of the stiffening frame.

The upper support comprises a main body made from an elastomeric material, preferably rubber, filtering the vibrations, i.e., preventing vibrations from travelling to the radiator 1, and a fixing element made from a second material, preferably plastic, having a higher hardness than the material of the main body. The fixing element comprises elastic retaining means configured to retain the upper support inside the stiffening frame when it is introduced into the housing of the stiffening frame.

In the radiator assembly of the invention the mounting of the radiator is very simple, secure and reliable. The upper part of the radiator is fixed to the stiffening frame by clipping, the number of operations required for mounting being reduced while at the same time correct mounting of the radiator being assured as a result of the elastic retaining means which assure the correct installation of the upper support in the stiffening frame, and accordingly the correct installation of the radiator.

These and other advantages and features will become evident in view of the drawings and the detailed disclosure.

DETAILED DESCRIPTION

Figure 1:
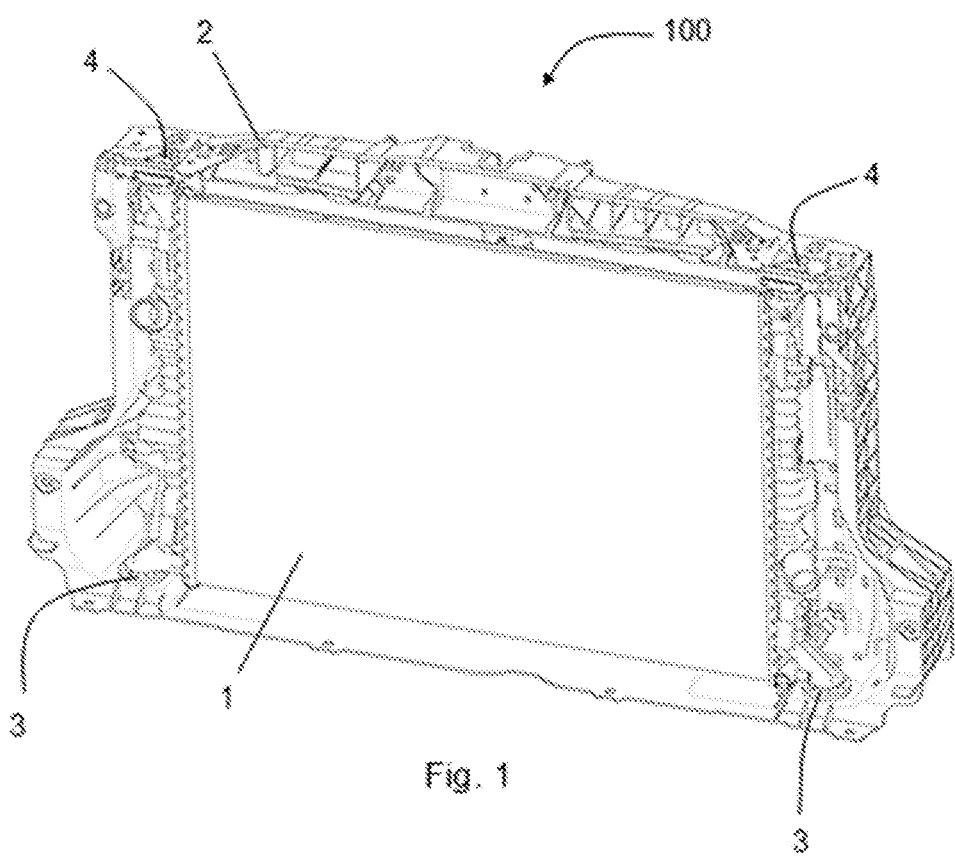
FIG. 1 shows a perspective view of a radiator assembly according to one embodiment.

FIG. 1 shows an embodiment of a radiator assembly 100 in which the assembly 100 comprises a radiator 1 supported by a stiffening frame 2. The stiffening frame 2 enables the attachment of the radiator 1 to a front panel of a vehicle, not shown in the drawings.

The radiator 1 is attached to the stiffening frame 2 through at least one upper support 4 that has previously been attached to the radiator 1. The upper support 4 is fixed in a housing 8 of the stiffening frame 2.

The upper support 4 is configured for absorbing vibrations, i.e., for preventing the vibrations from being transmitted to the radiator 1.

The upper support 4 comprises a main body 4a made from an elastomeric material, preferably rubber, and a fixing element 4b made from a second material, preferably plastic, having a higher hardness than the material of the main body 4a. The fixing element 4b comprises elastic retaining means 5 configured for retaining the upper support 4 when it is introduced into the housing 8 of the stiffening frame 2.

The mounting of the radiator 1 in the stiffening frame 2 is very simple, secure and reliable. The upper part of the radiator 1 is fixed to the stiffening frame 2 by clipping, the number of operations required for mounting being reduced while at the same time correct mounting of the radiator 1 being assured as a result of the elastic retaining means 5. The elastic retaining means 5 assures correct installation of the upper support 4 in the stiffening frame 2, and accordingly correct installation of the radiator 1.

According to one embodiment, the main body 4a is made of rubber, such as EPDM (ethylene propylene diene monomer), although it can also be made from other materials, such as natural rubber or silicone, for example. The fixing element 4b however, is made from a plastic material, for example polyamide 6/6 with a fiber weight percentage between 20% and 40%, preferably 30% by weight, polypropylene or polyoxymethylene (POM).

According to one embodiment, the main body 4a is overmolded on the fixing element 4b, there being a chemical bond between both components. A compact and robust upper support 4 is therefore obtained since both parts together form a single piece, i.e., the fixing element 4b is an integral part of the main body 4a.

Since it is a compact body, the radiator 1 is prevented from being able to oscillate during use when it is mounted in the vehicle or the main body 4a and the fixing element 4b are prevented from accidentally becoming uncoupled, preventing the radiator 1 from coming loose from the stiffening frame 2, and accordingly from the front panel of the vehicle, causing a risk situation.

As already discussed, the upper support 4 cooperates with a housing 8 arranged in the upper part of the stiffening frame 2. When the radiator 1 is pushed for the installation thereof or for it to be fixed to the stiffening frame 2, the upper support 4 is retained in the stiffening frame 2 by the elastic retaining means 5, as described in detail below.

Figure 6:
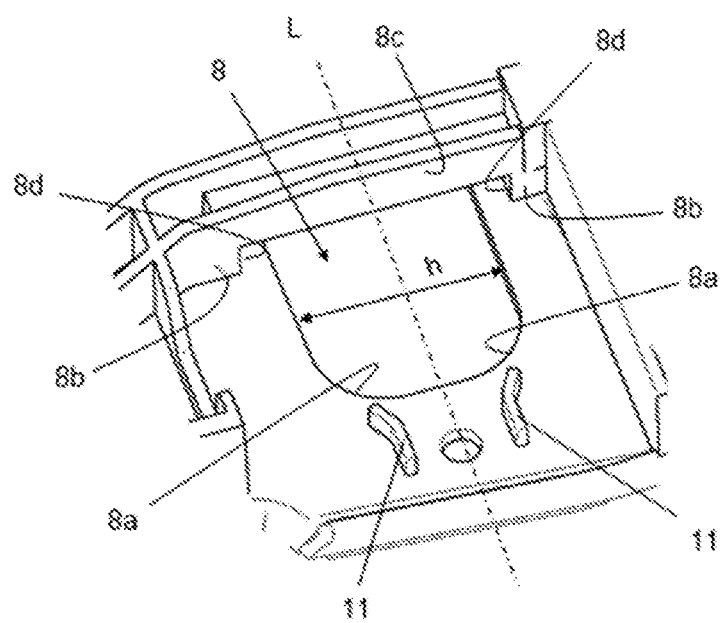
FIG. 6 shows a second detail of the front panel of FIG. 1.
Figure 7A:
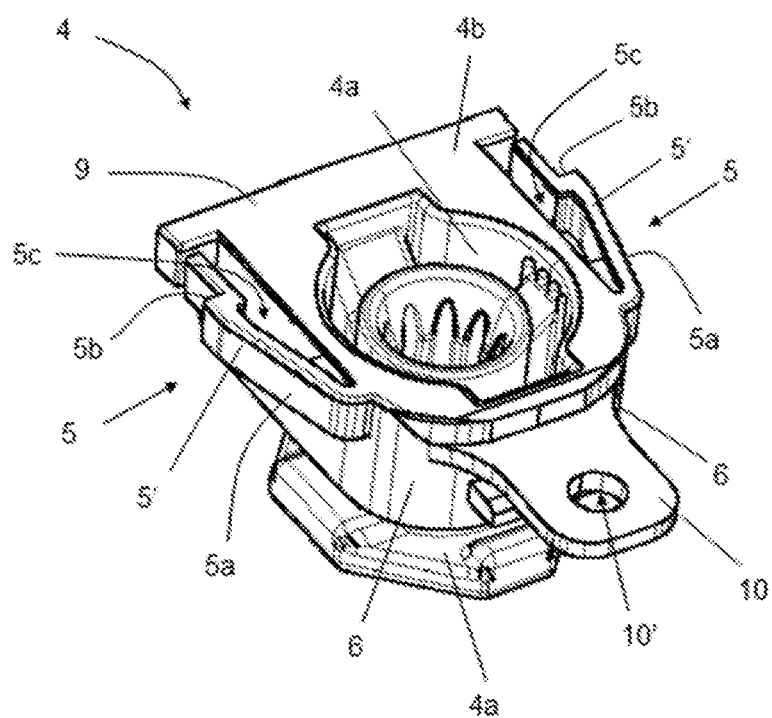
FIG. 7A shows a first perspective view of the upper support of the radiator assembly of FIG. 1.

According to one embodiment, the housing 8 of the stiffening frame 2 comprises a first abutment wall 8a, as shown in the detail of FIG. 6, and the fixing element 4b of the upper support 4 comprises at least one abutment area 6, shown in FIG. 7A, interacting with the first abutment wall 8a during insertion of the upper support 4, limiting the forward movement of the support 4 in an insertion direction X. The insertion direction X corresponds with the direction for moving the radiator 1 closer to the stiffening frame 2 in a direction substantially parallel to the longitudinal axis L of the housing 8 of the stiffening frame 2.

The housing 8 also comprises a second abutment wall 8b, shown in FIG. 6, arranged at a distance from the first abutment wall 8a, cooperating with at least one retaining area/shoulder 5b comprised in the retaining means 5 of the upper support 4. The retaining area 5b is also arranged at a distance from the abutment area 6. The interaction between the retaining area 5b of the upper support 4 and the second abutment wall 8b limit the movement of the upper support 4 in a rearward direction opposite the forward main insertion direction X. Therefore, the upper support 4 is retained between the first abutment wall 8a and the second abutment wall 8b.

During insertion of the radiator 1 in the stiffening frame 2, the upper support 4 does not interfere with any element of the stiffening frame 2 preventing or hindering the insertion thereof; therefore, the radiator 1 can be mounted in a simple and rapid manner. A simple movement for pushing the radiator 1 towards the stiffening frame 2 is enough for the radiator 1 to be fixed to the stiffening frame 2.

According to one embodiment, the retaining means 5 of the upper support 4 comprise an elastic arm 5' arranged on each side of the fixing element 4b which protrudes laterally, as shown in FIG. 7a, such that a gap 5c is formed between each arm 5' and the fixing element 4b.

The retaining area/shoulder 5b is arranged close to a free end of each arm 5'. The stiffening frame 2 comprises one abutment wall 8b for each retaining area 5b.

As seen in FIG. 6, the two abutment walls 8b are communicated by a bridge 8c, an abutment wall 8b being arranged in each leg of the bridge 8c. The support 4 is arranged below the bridge 8c, during and after the insertion.

Figure 7B:
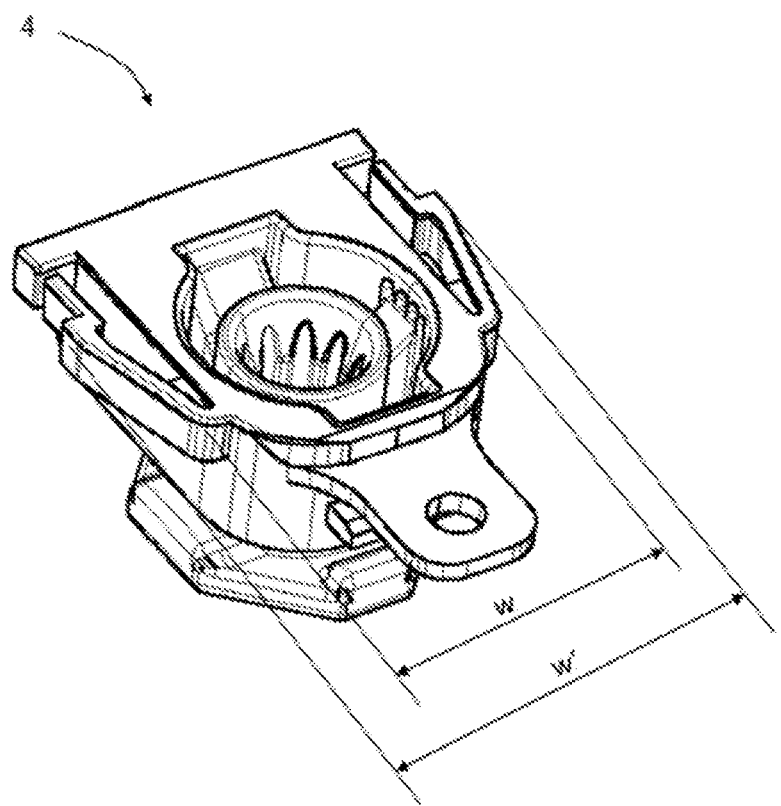
FIG. 7B shows a second perspective view of the upper support of FIG. 7A.

As seen in FIG. 6, the housing 8 of the stiffening frame 2 comprises a width h. As observed in FIG. 7B, the width w of the retaining means 5 at the height of the fixed end of the arms 5' is less than the width w' of the retaining means 5 close to the retaining area/shoulder 5b. The first width w is less than the width h of the housing 8 and the second width w' is greater than the width h. Therefore, during insertion of the upper support 4, the arms 5' of the retaining means 5 are elastically deformed as they pass through pushed by a pushing wall 8d arranged on the side of each abutment wall 8b, recovering its original shape once the upper support 4 has reached the insertion position, i.e., the end of its path of travel, the support 4 being retained between the first abutment wall 8a and the second abutment wall 8b of the stiffening frame 2. As shown in FIG. 6, the pushing walls 8d may be arranged perpendicular to the abutment walls 8b.

As shown in FIG. 7A, each arm 5' comprises an inclined pushing surface 5a cooperating with the corresponding pushing wall 8d of the stiffening frame 2.

According to one embodiment, the arms 5' of the upper support 4 are supported on the stiffening frame 2 in the areas close to the housing 8 of the stiffening frame 2 after insertion of the upper support 4.

Figure 3:
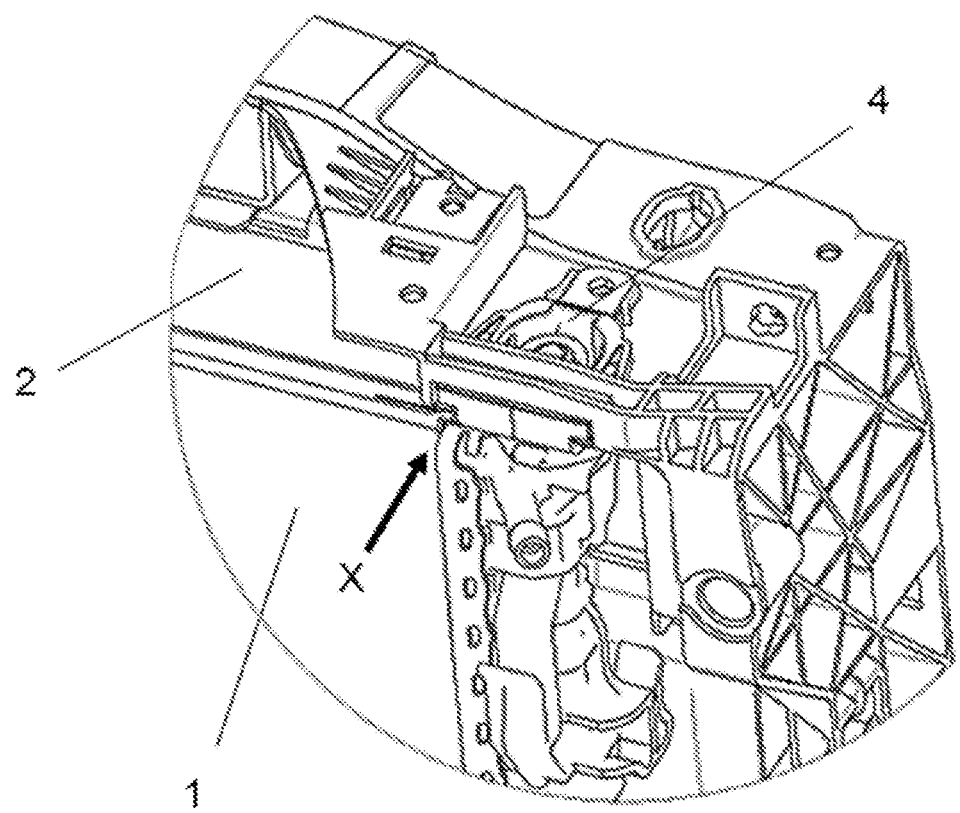
FIG. 3 shows a second detail of the radiator assembly of FIG. 1.

The fixing element 4b of the upper support 4 according to the preferred embodiment of the invention, also comprises a T-shaped end area 9 arranged at one end, as shown in FIG. 7A, the bridge 8c of the stiffening frame 2 being arranged between the retaining areas 5b and the end area 9 after insertion of the upper support 4, as seen in FIG. 3.

The bridge 8c is part of the reinforcing ribs of the stiffening frame 2; therefore, the latter is structurally stiffened.

According to one embodiment, the upper support 4 also includes a projection 10 protruding from the fixing element 4b, being arranged between two guiding flanges 11 comprised in the stiffening frame 2, as shown in FIG. 6, after insertion of the upper support 4 in the housing 8. These guiding flanges 11 are advantageous for preventing the upper support 4 from being able to rotate during insertion and for absorbing the tolerance that may exist between the fixing element 4b and the housing 8. The projection 10 is also supported on the stiffening frame 2 after insertion.

Optionally, the projection 10 can comprise a hole 10' which allows further fixing the upper support 4 to the stiffening frame 2 through auxiliary attachment means, for example a screw.

The projection 10 of the fixing element 4b and the guiding flanges 11 of the stiffening frame 2 are optional.

Figure 2:
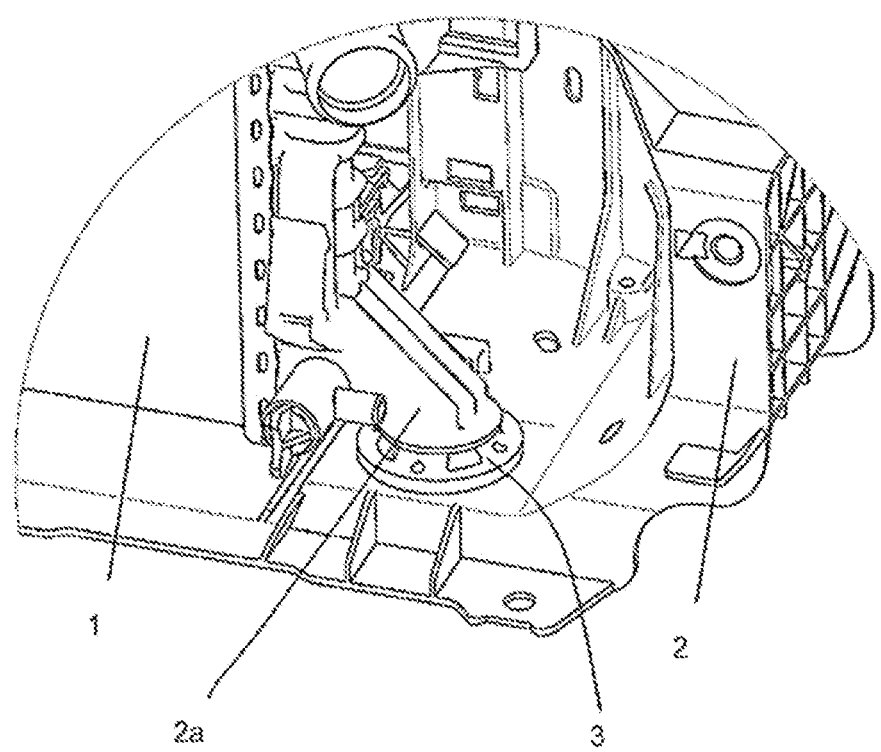
FIG. 2 shows a first detail of the radiator assembly of FIG. 1.
Figure 4:
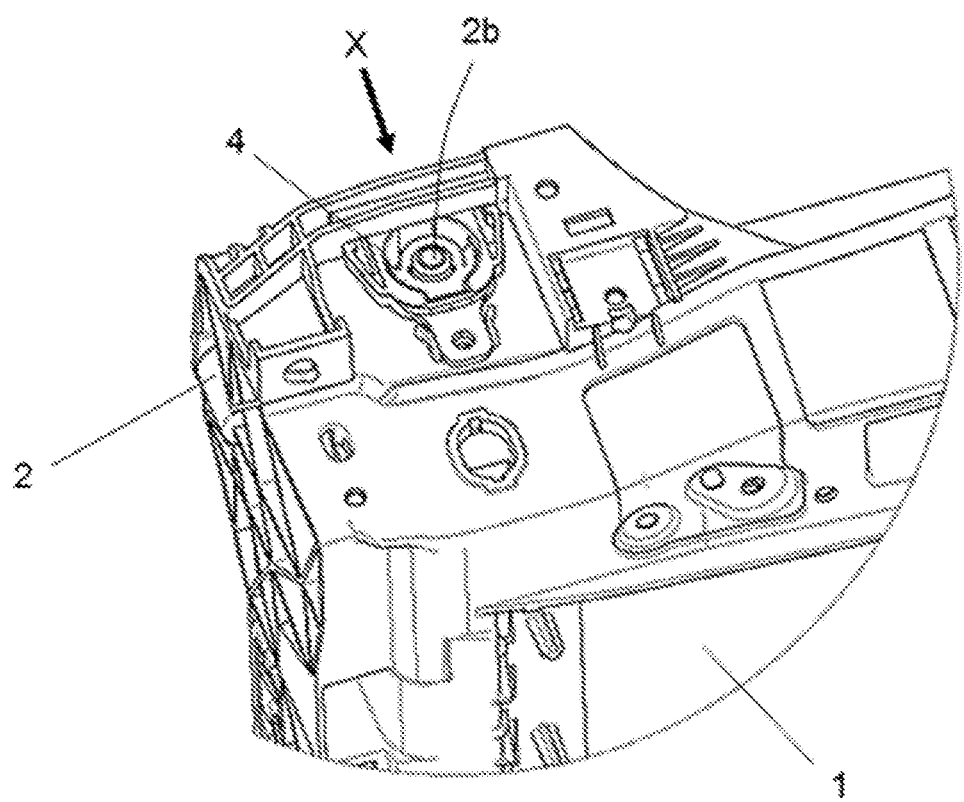
FIG. 4 shows a third detail of the radiator assembly of FIG. 1.
Figure 5:
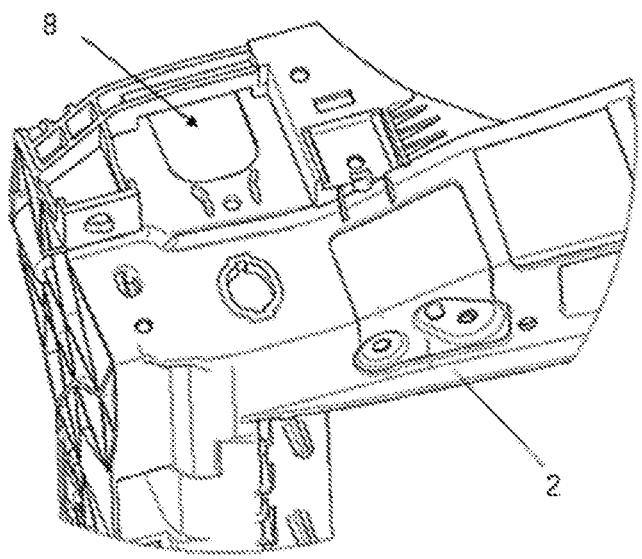
FIG. 5 shows a first detail of the front panel of the radiator assembly of FIG. 1.

In the example of FIG. 1, the radiator 1 is rectangular and comprises coupling means configured for being able to be attached to the upper support 4. The coupling means includes an upper pin 2b and a lower pin 2a arranged on each side of the radiator 1, the upper pins 2b being located in the upper supports 4 and the lower pins 2a being located inside lower supports 3. The lower supports are preferably made of rubber. Therefore, the radiator 1 of the example of FIG. 1 is supported in the stiffening frame 2 using two lower supports 3 (see detail of FIG. 2) and two upper supports 4 (see details of FIGS. 3 and 4).

According to one embodiment, both the lower pins 2a and the upper pins 2b protrude from the corresponding side of the radiator 1 and include portions that extend in a direction substantially parallel to the side, the upper pins 2b facing upwards, i.e., towards the upper part of the radiator 1, and the lower pins 2a facing downwards, i.e., towards the lower part of the radiator 1.

As seen in the example of the upper support 4 of FIG. 7A, the fixing element 4b surrounds at least partially the main body 4a, the main body 4a being in contact with the radiator 1, preferably with one of the upper pins 2b of the radiator 1, and the fixing element 4b in contact with the stiffening frame 2.

In a prior step for mounting the radiator 1 in the stiffening frame 2, the coupling means of the radiator 1, i.e., in the corresponding upper pins 2b and lower pins 2a are respectively housed in the upper supports 4 and the lower supports 3.

The lower supports 3 are like those described in the prior art, i.e., made of rubber and without a fixing element, and like the upper supports 4, they are also configured for absorbing the vibrations.

In an initial insertion step, the lower coupling means of each side of the radiator 1 are housed in lower housings of the stiffening frame 2 according to another insertion direction, perpendicular to insertion direction X. Since the lower supports 3 are made of rubber, they allow tilting the radiator 1 during insertion of the lower supports 3 in the lower housings of the lower frame 2, which prevents interferences with the upper part of the stiffening frame 2.

Finally, in a final fixing step, the upper part of the radiator 1 is pushed according to the insertion direction X, the radiator 1 being fixed and retained in the stiffening frame 2 by clipping through the elastic retaining means 5 of each upper support 4, retaining the corresponding upper support 4 when it is introduced into the housing 8 of the corresponding stiffening frame 2, as has already been described.

What is claimed is:

1. A radiator assembly comprising:
a radiator including an upper pin projecting from an upper part of the radiator;
a stiffening frame supporting the radiator and enabling an attachment of the radiator to a front panel of a vehicle, the stiffening frame including a housing; and
an upper support through which the radiator is attached to the stiffening frame, the upper support being fixed inside the housing of the stiffening frame and including a main body and a fixing element, the fixing element being made of a plastic material, the main body being made of an elastomeric material that is capable of absorbing vibrations transmitted to the main body by the stiffening frame, the elastomeric material having a first hardness, the plastic material of the fixing element having a second hardness that is greater than the first hardness, the upper pin of the radiator residing fixed inside an aperture of the main body, the fixing element including a first elastic arm having a fixed end portion and a free end portion, the free end portion being movable between a first lateral position and a second lateral position located inward of the first lateral position, the free end portion being constantly urged toward the first lateral position and engaging a first portion of the stiffening frame to fix the upper support inside the housing of the stiffening frame;
the housing of the stiffening frame including a first abutment wall and a first portion of the upper support contacts the first abutment wall of the stiffening frame to limit movement of the upper support inside the housing in a forward direction, the housing further including a second abutment wall facing towards and arranged spaced away from the first abutment wall, the first end portion of the first elastic arm including a shoulder that contacts the second abutment wall of the stiffening frame to limit movement of the upper support in a direction opposite the forward direction.

2. The radiator assembly according to claim 1, wherein the elastomeric material of the main body of the upper support is selected from the group consisting of synthetic rubber, natural rubber and silicone.

3. The radiator assembly according to claim 1, wherein the main body of the upper support is overmolded on the fixing element.

4. The radiator assembly according to claim 1, wherein the main body of the upper support is overmolded on the fixing element such that the main body and fixing element are chemical bonded to one another to form a single piece upper support.

5. The radiator assembly according to claim 1, wherein the first portion of the upper support is a part of the fixing element.

6. The radiator assembly according to claim 1, wherein a part of the second end portion of the first elastic arm extends rearward of the second abutment wall.

7. The radiator assembly according to claim 6, wherein the housing of the stiffening frame includes a bridge that extends across a portion of the upper support, the part of the second end portion of the first elastic arm extending across a surface of the bridge.

8. The radiator assembly according to claim 1, wherein the fixing element is made from polyamide, polypropylene or polyoxymethylene.

9. The radiator assembly according to claim 1, wherein the fixing element further includes a forward protruding projection and the stiffening frame includes a pair of guiding flanges interacting with the forward protruding projection to prevent rotation of the fixing element when the fixing element is inserted into the housing of the stiffening frame.

10. The radiator assembly according to claim 1, wherein the radiator includes a lower pin projecting from a lower part of the radiator, the stiffening frame including a lower support in which the lower pin resides.

11. The radiator assembly according to claim 10, wherein the lower support surrounds the lower pin and is made of a material that absorbs vibrations transmitted to the lower support by the stiffening frame.

12. A radiator assembly comprising:
a radiator including an upper pin projecting from an upper part of the radiator;
a stiffening frame supporting the radiator and enabling an attachment of the radiator to a front panel of a vehicle, the stiffening frame including a housing; and
an upper support through which the radiator is attached to the stiffening frame, the upper support being fixed inside the housing of the stiffening frame and including a main body and a fixing element, the fixing element being made of a plastic material, the main body being made of an elastomeric material that is capable of absorbing vibrations transmitted to the main body by the stiffening frame, the elastomeric material having a first hardness, the plastic material of the fixing element having a second hardness that is greater than the first hardness, the upper pin of the radiator residing fixed inside an aperture of the main body, the fixing element including a first elastic arm having a fixed end portion and a free end portion, the free end portion being movable between a first lateral position and a second lateral position located inward of the first lateral position, the free end portion being constantly urged toward the first lateral position and engaging a first portion of the stiffening frame to fix the upper support inside the housing of the stiffening frame, the fixing element including a second elastic arm, the first elastic arm being located on a first side of the fixing element and the second elastic arm being located on a second side of the fixing element, the second side being opposite the first side, the second elastic arm having a fixed end portion and a free end portion, the free end portion of the second elastic arm being movable between a first lateral position and a second lateral position located inward of the first lateral position, the free end portion of the second elastic arm being constantly urged toward the first lateral position and engaging with a second portion of the stiffening frame to fix the upper support inside the housing of the stiffening frame;

the housing of the stiffening frame including a first abutment wall and a first portion of the upper support contacts the first abutment wall of the stiffening frame to limit movement of the upper support inside the housing in a forward direction, the housing of the stiffening frame including second and third abutment walls that each face towards and is arranged a spaced-away from the first abutment wall, the first end portions of the first and second elastic arms respectively including a first shoulder and a second shoulder, the first and second shoulders respectively interacting with the second and third abutment walls of the stiffening frame to limit movement of the upper support in a direction opposite the forward direction.

13. The radiator assembly according to claim 12, wherein a part of the second end portion of the first elastic arm extends rearward of the second abutment wall and a part of the second end portion of the second elastic arm extends rearward of the third abutment wall.

14. The radiator assembly according to claim 13, wherein the housing of the stiffening frame includes a bridge that extends across a portion of the upper support, the part of the second end portion of the first elastic arm extending across a first surface of the bridge, the part of the second end portion of the second elastic arm extending across a second surface of the bridge, the first and second surfaces facing one another.

* * * * *